Patented Oct. 20, 1925.

1,558,248

UNITED STATES PATENT OFFICE.

JOHN M. DENNISON, OF NEW YORK, N. Y.

HEAT-GENERATING COMPOSITION.

No Drawing.   Application filed August 5, 1925.   Serial No. 48,406.

*To all whom it may concern:*

Be it known that I, JOHN M. DENNISON, a subject of the King of England, residing at New York city, borough of Bronx, State of New York, have invented a new and useful Heat-Generating Composition, of which the following is a specification.

My invention relates to a composition of matter which generates heat by chemical reaction between its components and which has for its main and particular object to produce a composition which will give off a relatively large amount of heat at a relatively high, uniform temperature over an extended period of time.

A further object is to produce a composition which will be free of obnoxious and unhealthy odors and which may be handled without injury or inconvenience.

A still further object is to produce a composition in which the reaction, causing the heat liberation, may be started and stopped repeatedly before the reaction has run to equilibrium.

While I am aware that other heat generating compositions have been invented, my invention resides principally in the greater amount of heat units liberated, the uniform rate of liberation over the whole period in which the reaction takes place and the absence of odor during such reaction.

The composition consists of the following ingredients, in the proportion given:

| | Lbs. |
|---|---|
| Oxidized iron filings | 100 |
| Ammonium chloride | 2 |
| Calcium oxide | 4 |
| Sulphuric acid | 6 | and is compounded in the following manner: The iron filings, which form the base of the composition are saturated with water and exposed to the action of the air until oxidized and dry. After the iron filings are thus treated, the ammonium chloride and calcium oxide are added and all mixed and comminuted in a suitable grinding machine. Lastly, the sulphuric acid is incorporated in the mixture and the compound dried. In its dried state, the composition is inert and no reaction takes place until water is added.

While the heat generating properties of the composition may be applied to various uses, it may be well, for the purpose of illustration, to describe its use in a specific case without, however, limiting myself to such use. With this in mind, I will describe its use in a heat bag such as is commonly used for alleviating pain, an example of which is the ordinary hot water bag.

In the above case, the dry composition is placed in a closely woven fabric bag. When heat is required, water is added to the composition, in the ratio of about 1 fluid ounce to 1 pound of composition, and the fabric bag enclosed in a water proof envelope to retard evaporation. Each application of water will cause a generation of heat, at a relatively uniform temperature, for a period of time in excess of 24 hours.

When heat is required for a shorter period of time, the fabric bag is removed from the waterproof envelope and, together with its contents, allowed to dry, thus stopping the chemical reaction. It may then be put aside for future use and subsequently used for long or short periods of time up to a total of approximately 150 hours.

Having described my invention and one of its uses, what I claim as new and wish to protect by Letters Patent is:

1. A composition consisting of oxidized iron filings, ammonium chloride, calcium oxide, and sulphuric acid, said composition made heat generating by the addition of water.

2. A composition consisting of 100 lbs. of oxidized iron filings, 2 lbs. of ammonium chloride, 4 lbs, of calcium oxide, and 6 lbs. of sulphuric acid, said composition made heat generating by the addition of water.

3. A dried composition consisting of oxidized iron filings, ammonium chloride, calcium oxide, and sulphuric acid, said composition made heat generating by the addition of water.

4. A dried composition consisting of 100 lbs, of oxidized iron filings, 2 lbs. of ammonium chloride, 4 lbs. of calcium oxide, and 6 lbs. of sulphuric acid, said composition made heat generating by the addition of water.

5. A dried composition consisting of 100 lb. of oxidized iron filings, 2 lbs. of ammonium chloride, 4 lbs. of calcium oxide, and 6 lbs. of sulphuric acid, said composition made heat generating by the addition of water in the proportion of 1 fluid oz. of water to 1 lb. of the dried composition.

JOHN M. DENNISON.